Patented Jan. 22, 1946

2,393,510

UNITED STATES PATENT OFFICE 2,393,510

PRODUCTION OF UNSATURATED KETONES

William A. Bailey, Jr., Oakland, and Walter H. Peterson, Berkeley, Calif., assignors to Shell Development Company, San Francisco, Calif., a corporation of Delaware No Drawing. Application June 23, 1941,
Serial No. 399,396

17 Claims. (Cl. 260—586)

This invention relates broadly to a method for the production of higher unsaturated ketones from lower ketones. More particularly, the invention is concerned with a process for catalytically converting ketones in the vapor phase to unsaturated ketone condensation products. Specifically, the invention deals with a novel method for producing isophorone from acetone.

Various methods have been described for converting acetone into isophorone. These methods are reviewed by Vaughn and Jackson in U. S. Patent 2,183,127 and their unsuitability is pointed out. The patent also discloses that isophorone may be obtained by contacting acetone in the vapor phase at elevated temperatures with calcium carbide, calcium oxide or calcium hydroxide. The patent, however, shows that throughput or space velocity of the acetone that is used with these catalysts is small and that therefore the rate of production of isophorone is low. It is further shown that the activity of these catalysts decreases during use, but that they may be reactivated to a considerable extent by cooling and washing with cold acetone. However, catalysts requiring such a regenerative procedure are not attractive for technical scale use since the reactivation requires that the catalyst be cooled or permitted to cool from the operating temperature of upwards of 200° C., washing the catalyst with acetone, and then reheating again to the operating temperature. Such an operation is excessively time-consuming and expensive in cost of cooling and reheating for use in large-scale manufacture.

It is an object of the present invention to provide an improved process for the manufacture of isophorone. Another object resides in providing a process for isophorone production wherein the catalyst-regenerative step is comparatively simple and inexpensive. A further object is to provide a method for producing higher unsaturated ketones from lower ketones. These and other objects will be apparent from the description of the invention given hereinafter.

The process of the invention is based upon our discovery that alkali metal or alkaline earth metal salts of a weak, inorganic oxy acid of an amphoteric element are efficient catalysts for the condensation of ketones in the vapor phase. This group of catalysts, besides permitting the use of higher space velocities than was heretofore shown to be possible, are easily regenerated in a simple and economical manner, which will be described later. As examples of typical compounds suitable for use in the process, there may be listed: calcium aluminate, sodium aluminate, calcium borate, potassium zincate, magnesium plumbate, barium aluminate, lithium plumbate, sodium borate, strontium stannate, potassium stannate, calcium aurate, magnesium antimonate, sodium antimonate, calcium arsenate, sodium arsenate, potassium titanate, calcium zincate, magnesium aluminate, caesium borate, beryllium aluminate, rubidium arsenate, and the like. The catalysts are termed alkali metal or alkaline earth metal salts of "weak," inorganic oxy acids of an amphoteric element for the purpose of excluding salts of strong acids of amphoteric metals such as chromic acid, molybdic acid, etc. Of the various salts, the alkali metal and alkaline earth borates and aluminate constitute a preferred group, while calcium aluminate is a most preferred member thereof. The catalysts may be employed as granules, pellets, and the like or, if desired, may be ground and pressed into pills, etc. In some cases it may be preferable to mount the salts on, or use them to impregnate, inert carriers. Various substances may be employed as carriers, preferably those possessing a large expanse of surface such as pumice, silica gel, bauxite, diatomaceous earth, and the like. It is preferable that the catalyst consist predominantly of an alkali metal or alkaline earth metal salt of a weak, inorganic oxy acid of an amphoteric element.

The alkali metal or alkaline earth metal salts of a weak, inorganic oxy acid of an amphoteric element employed as catalysts may be prepared by methods known in the art or may be produced according to the methods outlined below which are given to illustrate preparation of a few typical and preferred catalysts.

Preparation A

To an aqueous solution of about 482 gms. of $AlCl_3 \cdot 6H_2O$ was slowly added, with stirring, a solution of approximately 336 gms. of KOH dissolved in a minimum amount of water. After filtration, a solution containing about 385 gms. of $CaCl_2 \cdot 2H_2O$ was added slowly to the clear filtrate. The precipitated calcium aluminate was filtered, washed thoroughly with water, dried at about 110° C., and finally calcined at 450° C.–500° C. for about one hour. The resultant material was broken up and screened.

Preparation B

To a solution of about 2720 gms. of $AlCl_3 \cdot 6H_2O$ (11.2 mols) in 3 liters of water was added a solution containing about 2688 gms. (67.2 mols) of NaOH in 5 liters of water until solution was practically complete. To this was further added, after cooling, a solution of approximately 1900 gms. (16.8 mols) of $CaCl_2$ in 2 liters of water. After cooling, the calcium aluminate was filtered off and washed twice with 5-liter portions of water by forming a slurry with the filter cake and refiltering. The precipitate was dried at about 110° C. and calcined for about 30 minutes at 500° C.

Preparation C

Approximately 9.3 mols of aluminum salts (aluminum nitrate and aluminum chloride) was dissolved in 5 liters of water. To this was added about 2430 gms. (55.7 mols) of solid NaOH. The mixture boiled and a clear solution of sodium aluminate remained. A hot solution of about 1545 gms. (13.9 mols) of $CaCl_2$ in 2 liters of water was added in one portion. The lumps of precipitate were broken up and the calcium aluminate was filtered off, washed with water, dried, and calcined as described in Preparation B although the washing was less thorough than in that preparation.

Preparation D

Calcium metaborate was prepared by using a solution of about 763 gms. of borax and 160 gms. of NaOH in 4 liters of water to which was added about 444 gms. of $CaCl_2$ in 2 liters of water. The precipitate was filtered, washed, dried, and calcined in a similar manner to that described in the foregoing preparations.

Preparation E

A catalyst consisting of sodium aluminate mounted on pumice was prepared. To a solution of approximately 106 gms. of NaOH in 2 liters of water were added about 207 gms. of $Al(OH)_3$ and 75 gms. of 10–14 mesh pumice. After evaporation to dryness and calcination for one hour at about 500° C., the solid mass was broken up and screened.

According to the process of the invention, a ketone such as acetone is contacted in the vapor phase at elevated temperature with the catalyst to produce higher unsaturated ketones. The catalysts yield particularly desirable results. For example, with acetone good conversions are obtained at comparatively high space velocities, i. e. at high throughputs measured in volumes of liquid at room temperature (20° C.) per volume of catalyst space per hour. Furthermore, the conversion products with acetone are principally mesityl oxide, isophorone, and smaller amounts of higher condensation products, the amount of phorone and the hydrocarbon mesitylene produced being none, or substantially none.

The results obtained in converting acetone with several of the catalysts prepared are tabulated below:

| Catalyst from preparation— | Average reaction temp., °C. | Liquid space velocity | Weight per cent conversion | Weight per cent of condensation | | |
|---|---|---|---|---|---|---|
| | | | | Mesityl oxide | Isophorone | Higher products |
| A | 341 | 1.76 | 7.3 | 67.0 | 11.0 | 22.0 |
| D | 353 | 0.72 | 14.5 | 72.5 | 22.0 | 5.5 |
| E | 348 | 0.73 | 3.6 | 83.5 | | [1] 16.5 |

[1] Mixture which was predominantly isophorone.

The desired condensation products are obtained by contacting the ketone vapor with the catalyst. It is desirable that the temperature in this operation be above about 250° C. A preferred temperature for execution of the process is from about 300° C. to 400° C. With a given space velocity and at increasing temperatures for a particular catalyst, the conversion to higher condensation products is increased. It is desirable that the upper limit of temperature be fixed so that the amount of normally gaseous by-products which are produced at higher temperatures is not appreciable or excessive. This will be governed to a considerable extent by the space velocity chosen. The higher space velocity, the higher is the permissible operating temperature before the formation of the gaseous by-products becomes excessive. In general, the process is executed at a temperature below that at which the formation of normally gaseous by-products becomes appreciable at the operating space velocity.

The effects of temperature are indicated by the results tabulated below which were obtained for conversion of acetone. The catalyst was calcium aluminate from Preparation C.

| Average reaction temp., °C. | Liquid space velocity | Weight per cent conversion | Mol per cent gas | Weight per cent of condensate as— | | |
|---|---|---|---|---|---|---|
| | | | | Mesityl oxide | Iso-phorone | Higher products |
| 349 | 0.71 | 7.3 | 0.03 | 69.2 | 25.3 | 5.5 |
| 402 | 0.73 | 14.5 | 0.81 | 72.4 | 25.9 | 1.7 |
| 458 | 0.73 | 25.6 | 4.25 | 64.4 | 26.0 | 9.6 |

The particular space velocity at which the process is operated has an effect upon the products produced. In general, the lower the space velocity, i. e. the longer the contact time, the larger is the proportion of more complex and higher-condensation products as well as the larger is the conversion of the ketone treated. Thus, in the conversion of acetone, decreasing space velocities produce higher conversion of the acetone, a lower proportion of mesityl oxide in the product, a higher proportion of isophorone, a higher proportion of higher-condensation products than isophorone, and a larger amount of normally gaseous by-products. These effects are evident from the results with acetone tabulated below. The catalyst was calcium aluminate from Preparation C which had been reactivated.

| Average reaction temp., °C. | Liquid space velocity | Weight per cent conversion | Mol per cent gas | Weight per cent of condensate as— | | |
|---|---|---|---|---|---|---|
| | | | | Mesityl oxide | Iso-phorone | Higher products |
| 424 | 0.36 | 33.1 | 2.04 | 32.2 | 42.8 | 25.0 |
| 426 | 0.71 | 27.2 | 0.88 | 45.2 | 38.9 | 15.9 |
| 426 | 1.46 | 19.0 | 0.20 | 63.3 | 29.6 | 7.1 |
| 426 | 2.11 | 12.7 | 0.08 | 71.9 | 23.1 | 5.0 |

After the catalysts have been in operation for some time, their activity declines due to the deposition of carbonaceous material thereon. In fact, they will completely lose their activity if used for a sufficiently long period of time. We have now discovered that the activity may be completely or substantially restored by a simple treatment. The reactivation consists in burning off the deposits on the catalyst by treatment with an oxygen-containing gas such as air. Since the reactivation is an essential step in the operation of the process over long periods such as are encountered in industrial application thereof, the invention further contemplates a process for the production of unsaturated ketones which comprises contacting a condensable ketone in the vapor phase at an elevated temperature with an alkali metal or alkaline earth metal salt of a weak, inorganic oxy acid of an amphoteric element, and occasionally interrupting the flow of ketone and burning carbonaceous material from the catalyst with oxygen-containing gas. By bringing an oxygen-containing gas into contact under combustion-promoting conditions with the catalyst upon which combustible material such as carbon, resinous materials, etc., are deposited, the activity of the catalyst is improved, restored, or sometimes even increased as compared to fresh catalyst after removal of the carbonaceous materials thereon. The temperature at which the deposit will ignite when brought into contact with oxygen will vary somewhat with the character of the deposit. Ordinarily, a temperature of 500° C. and upwards is suitable for starting and maintaining the combustion. The oxygen-containing gas employed for the reactivation may be air or substantially-pure $O_2$, or it may be oxygen diluted with various amounts of other inert gases such as nitrogen, carbon dioxide, steam, etc. The temperature during the reactivation should not, of course, be permitted to rise to such a point that substantial sintering or damage to the catalyst occurs.

The effect of the reactivation of the catalysts in the process may be illustrated by the results obtained in converting acetone tabulated below. In this case the reactivation was made with air over a period of about two hours at about 520° C.–550° C. and with a hot spot temperature of 600° C. The catalyst was calcium aluminate from Preparation C. The catalyst had been in use fifty (50) hours when its condition was considered "spent."

| Catalyst condition | Liquid space velocity | Average reaction temp., °C. | Weight per cent conversion | Weight per cent condensate as— | | |
|---|---|---|---|---|---|---|
| | | | | Mesityl oxide | Isophorone | Higher products |
| Fresh | 0.71 | 349 | 7.3 | 69.2 | 25.3 | 5.5 |
| Spent | 0.73 | 349 | 4.2 | | | |
| Reactivated | 0.73 | 350 | 11.5 | 68.9 | 24.0 | 7.2 |

Since ketones being converted readily ignite upon coming into contact with oxygen under the operating conditions of temperature, it is desirable that the reaction zone be purged with an inert atmosphere both before and after the reactivation treatment.

If it is desired that isophorone be the primary product in the conversion of acetone, this may be realized by recycling the mesityl oxide back through the converter so that its overall production is substantially suppressed. By adding mesityl oxide to the acetone feed, the formation of additional mesityl oxide may be limited or substantially suppressed, depending upon the proportion of mesityl oxide present in the feed. The effect of adding mesityl oxide to the feed is evident from the results given below. The feed consisted of 84.2 per cent by weight of acetone and 15.8 per cent mesityl oxide. The catalyst consisted of calcium aluminate from Preparation B. Under the particular conditions employed, it is seen that there was less mesityl oxide obtained in the products than was fed to the reactor.

| Average reaction temp., °C. | Liquid space velocity | Composition of product in weight per cent | | | | |
|---|---|---|---|---|---|---|
| | | Acetone | Mesityl oxide | Water | Isophorone | Higher products |
| 353 | 0.73 | 72.8 | 10.6 | 3.9 | 10.2 | 2.5 |

In executing the process for the production of isophorone, the product from the reaction zone may be separated into its several constituents, preferably by distillation, and the mesityl oxide recycled to the reaction zone. In this manner, the addition of mesityl oxide to the reaction zone by means of the feed thereto substantially suppresses formation of this product in additional quantities.

While the invention has been described with particular reference to the conversion of acetone, this is done merely for convenience. The invention also contemplates the production of unsaturated ketones by contacting any condensable ketone with the catalyst masses under condensing conditions in a like manner as has been described for acetone. By "a condensable ketone" reference is made to those ketones which are capable of combining with themselves to form higher, more complex, unsaturated ketones. Besides acetone, the condensable ketones include methyl ethyl ketone, methyl propyl ketone, methyl isobutyl ketone, methyl isopropyl ketone, diethyl ketone, dipropyl ketone, ethyl hexyl ketone, cyclopentanone, cyclohexanone, methyl cyclohexanone, acetophenone, and the like. A preferred group of reactants are condensable methyl ketones, by which term is meant ketones which contain a methyl group directly linked to the carbonyl group.

To illustrate the conversion of other ketones than acetone, the results obtained with methyl ethyl ketone are given below. The catalyst employed was calcium aluminate. Under the reaction conditions, the principal product was an 8-carbon-atom unsaturated ketone which was apparently homomesityl oxide.

| Average reaction temp., °C. | Liquid space velocity | Weight per cent conversion | Weight per cent of condensate as— | |
|---|---|---|---|---|
| | | | $C_8$ unsaturated ketone | $C_{12}$ unsaturated ketone |
| 352 | 0.70 | 9.0 | 88.2 | 11.8 |

The products which are emitted from the reaction zone are condensed to liquids and the unreacted ketone subjected to the conversion treatment together with the other products are separated preferably by distillation, which may, if desired, be under reduced or subatmospheric pressure. The unreacted ketone which is recovered may be recycled to the reaction zone for further conversion by additional passages therethrough.

While execution of the process of the invention has been described with particular reference to intermittent operation, i. e. a cycle comprising conversion of the condensable ketone followed by intermittent reactivation treatment of the catalyst, the invention also includes a truly continuous mode of operation. This method consists of employing the catalyst in the form of finely divided particles of suitable size which are preferably of substantially uniform size. The condensable ketone to be subjected to conversion treatment is passed in the vapor phase under conditions conducive to conversion with the finely divided catalyst at such a rate that the catalyst particles are in a state of ebullient motion, thereby imparting to them the appearance of a boiling liquid. The relative motion of the catalyst dust may be either concurrent or countercurrent to the ketone stream. By operation in this manner, the ketone and catalyst may be brought continuously into intimate contact, and after the desired degree of conversion has been attained the catalyst may be separated continuously from the organic products and subjected to reactivation with the oxygen-containing gas in a similar manner to that employed for conversion of the ketone. After reactivation, the regenerated catalyst may be again fed back to the conversion zone. It is seen that such operation of the process may be made continuous, or, if desired, it may be operated intermittently, using these principles.

We claim as our invention:

1. A process for the production of unsaturated ketones which comprises contacting acetone vapors with calcium aluminate at a temperature above 250° C., but below that at which formation of normally gaseous by-products becomes appreciable under the operating space velocity.

2. A process for the production of unsaturated ketones which comprises contacting acetone vapors with calcium borate at a temperature above 250° C., but below that at which formation of normally gaseous by-products becomes appreciable under the operating space velocity.

3. A process for the production of unsaturated ketones which comprises contacting acetone vapor with a calcium salt of a weak, inorganic oxy acid of an amphoteric element at a temperature above 250° C., but below that at which formation of normally gaseous by-products becomes appreciable at the operating space velocity and periodically regenerating said catalyst with an oxygen-containing gas under combustion-promoting conditions.

4. A process for the production of unsaturated ketones which comprises contacting acetone vapor with a calcium salt of a weak, inorganic oxy acid of an amphoteric element at a temperature above 250° C., but below that at which formation of normally gaseous by-products becomes appreciable at the operating space velocity.

5. A process for the production of unsaturated ketones which comprises contacting vapors of a methyl ketone with calcium aluminate at a temperature between about 300° C. and 400° C., and periodically reactivating said calcium aluminate with an oxygen-containing gas at a temperature above 500° C.

6. A process for the production of unsaturated ketones which comprises contacting vapors of a methyl ketone with calcium aluminate at a temperature above 250° C., but below that at which the formation of normally gaseous by-products becomes appreciable at the operating space velocity, and intermittently reactivating said catalyst by contact with an oxygen-containing gas under combustion-promoting conditions.

7. A process for the production of unsaturated ketones which comprises contacting vapors of a methyl ketone with calcium borate at a temperature above 250° C., but below that at which the formation of normally gaseous by-products becomes appreciable at the operating space velocity.

8. A process for the production of unsaturated ketones which comprises contacting vapors of a methyl ketone with calcium aluminate at a temperature above 250° C., but below that at which the formation of normally gaseous by-products becomes appreciable at the operating space velocity.

9. A process for the production of unsaturated ketones which comprises contacting vapors of a methyl ketone with an alkaline earth metal salt of a weak, inorganic oxy acid of an amphoteric element at a temperature above 250° C., but below that at which formation of normally gaseous by-products becomes appreciable at the operating space velocity.

10. A process for the production of unsaturated ketones which comprises contacting vapors of a condensable ketone with calcium aluminate at a temperature above 250° C., but below that at which the formation of normally gaseous by-products becomes appreciable at the operating space velocity.

11. A process for the production of unsaturated ketones which comprises contacting vapors of a condensable ketone with calcium borate at a temperature above 250° C., but below that at which the formation of normally gaseous by-products becomes appreciable at the operating space velocity.

12. A process for the production of unsaturated ketones which comprises contacting vapors of a condensable ketone with calcium aluminate at a temperature above 250° C., but below that at which the formation of normally gaseous by-products becomes appreciable at the operating space velocity.

13. A process for the production of isophorone which comprises contacting acetone vapors with calcium aluminate at a temperature between about 300° C. and 400° C. while recycling mesityl oxide separated from the product to the reaction zone, and periodically reactivating said calcium aluminate by contact with an oxygen-containing gas at a temperature above about 500° C.

14. A process for the production of isophorone which comprises contacting acetone vapors with calcium aluminate at a temperature between about 300° C. and 400° C., and recycling mesityl oxide separated from the product to the reaction zone.

15. A process for the production of isophorone which comprises contacting acetone vapors with an alkaline earth metal aluminate at a temperature above 250° C., but below that at which formation of normally gaseous by-products becomes appreciable at the operating space velocity while suppressing formation of mesityl oxide by simultaneous introduction of mesityl oxide with said acetone vapors to the reaction zone.

16. A process for the production of unsaturated ketones which comprises contacting vapors of a condensable ketone with a catalyst of the group consisting of the alkali metal and alkaline earth metal aluminates at a temperature above 250° C., but below that at which the formation of normally gaseous by-products becomes appreciable at the operating space velocity, and occasionally subjecting said catalyst to the effects of an oxygen-containing gas under combustion-promoting conditions.

17. A process for the production of unsaturated ketones which comprises contacting vapors of a condensable ketone with a catalyst of the group consisting of the alkali metal and alkaline earth metal salts of a weak, inorganic oxy acid of an amphoteric element at a temperature above 250° C., but below that at which the formation of normally gaseous by-products becomes appreciable at the operating space velocity.

WILLIAM A. BAILEY, Jr.
WALTER H. PETERSON.